(12) United States Patent
Liu et al.

(10) Patent No.: US 8,788,494 B2
(45) Date of Patent: Jul. 22, 2014

(54) METHOD, DEVICE AND SYSTEM FOR PROCESSING, BROWSING AND SEARCHING AN ELECTRONIC DOCUMENTS

(75) Inventors: Shi Xia Liu, Beijing (CN); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/543,881

(22) Filed: Aug. 19, 2009

(65) Prior Publication Data

US 2009/0307217 A1 Dec. 10, 2009

Related U.S. Application Data

(62) Division of application No. 11/014,522, filed on Dec. 16, 2004, now abandoned.

(30) Foreign Application Priority Data

Dec. 17, 2003 (CN) .............................. 200310123108

(51) Int. Cl.
*G06F 17/30* (2006.01)

(52) U.S. Cl.
USPC ............ 707/736; 707/728; 707/776; 370/252

(58) Field of Classification Search
USPC ................................... 707/705–789; 370/252
See application file for complete search history.

(56) References Cited

U.S. PATENT DOCUMENTS

| | | |
|---|---|---|
| 5,873,107 A | 2/1999 | Borovoy et al. |
| 5,893,908 A | 4/1999 | Cullen et al. |
| 5,907,836 A | 5/1999 | Sumita et al. |
| 6,026,388 A | 2/2000 | Liddy et al. |
| 6,038,567 A | 3/2000 | Young |
| 6,205,456 B1 | 3/2001 | Nakao |
| 6,314,419 B1 * | 11/2001 | Faisal ........................... 707/739 |
| 6,397,219 B2 | 5/2002 | Mills |
| 6,505,191 B1 * | 1/2003 | Baclawski ........................... 1/1 |
| 2002/0083045 A1 | 6/2002 | Utiyama et al. |
| 2002/0107824 A1 * | 8/2002 | Ahmed ........................... 706/46 |
| 2003/0061200 A1 | 3/2003 | Hubert et al. |
| 2004/0236805 A1 * | 11/2004 | Gordon ........................ 707/205 |
| 2009/0204674 A1 * | 8/2009 | Lim .............................. 709/205 |

FOREIGN PATENT DOCUMENTS

CN 1362681 A 8/2002

OTHER PUBLICATIONS

Monika et al., "Query-Free News Search", May 2003, WWW 2003, ACM 1-58113-680-Mar. 3, 2005.

* cited by examiner

*Primary Examiner* — Tony Mahmoudi
*Assistant Examiner* — Tuan-Khanh Phan
(74) *Attorney, Agent, or Firm* — Scully, Scott, Murphy & Presser, P.C.; William Stock, Esq.

(57) ABSTRACT

A method for processing electronic document and its corresponding device, a method for browsing electronic document and its corresponding browser, as well as a method for searching electronic document and its corresponding searching system are disclosed in the present invention. The method comprises at least the following steps of: generating one or more query according to the content of said document when an author is composing the electronic document; and correspondingly storing information about said one or more query with said electronic document. Wherein the query comprises keywords, keyword string or questions, and the query has passed the verification in order to ensure its reliability.

14 Claims, 6 Drawing Sheets

METHOD, DEVICE AND SYSTEM FOR PROCESSING, BROWSING AND SEARCHING AN ELECTRONIC DOCUMENTS

CROSS-REFERENCE TO RELATED APPLICATIONS

This application is a divisional of U.S. patent application Ser. No. 11/014,522, filed Dec. 16, 2004.

BACKGROUND

The present invention relates generally to the technology of data processing, and more particularly to a method for processing electronic document and its corresponding device, a method for browsing electronic document and its corresponding browser, as well as a method for searching electronic document and its corresponding searching system, based on technology of the search engine.

Search engine is a kind of technology rapidly developed with the booming information on the Internet. Search engine is used to collect, discover information according to certain strategies, as well as to understand, extract, manage and process the information, thus provide the user with retrieving service and reach the goal of information navigation. However, with the rapid evolution of Internet, content on the Internet are booming quickly. For example, the search engine, such as Google, is suffering from a main problem that a single query may produce a lot of relevant documents, but most of them may be irrelevant to the subject of the present query inputted by the user. At the same time, since that the keywords, keyword string or questions that are used in a query doesn't match the relevant documents, the real relevant documents will be missing. For the same reason, specific query often fails to produce any expected documents for a user's query. Because of the reasons above, when retrieving or searching the documents with search engine utilizing currently available technologies, the users feel that it is difficult to find the right things exactly and comprehensively that they want. This is another reason resulting in the users' dissatisfaction for the service quality of the search engine.

On the other hand, in currently available technologies, the document writing tools, the document management tools and the document retrieving or searching tools are independently, i.e., author will not concern with how the future readers retrieve or search and use the content of the document written by the author when he/she is writing the electronic document. However, simultaneously, from the point view of information accessing and using, user will feel it is difficult to find the right things he/she really wants to get.

Moreover, since the computer's low comprehension ability to the natural language is at the word level understanding, and as for document management tools and document retrieving tools, sentence and document level understanding together with semantic capabilities are needed to satisfy the user's needs. However, because of the limitation of related technologies and tools, the document management and the searching technologies can't be updated from current word level understanding to the sentence and document level understanding together with semantic capabilities in a short time. As a result, it can be imagined that the development of document retrieving technology can't meet the user's needs towards information accessing in next years.

BRIEF SUMMARY

In order to solve the problems mentioned above and improve the performance of currently available search engines, the present invention proposes that relevant information should be prepared for future document management and information retrieving when author is writing the electronic documents, i.e., when author is preparing the document, some tools are provided in order to contribute to user's convenient information retrieval. More specifically, when author is composing the document, he/she also prepares the relevant query on the content of the document, for example, a query may be some keywords, keyword string or some simple questions. Thus help users find the attached query information in the electronic document rapidly by using search engine, and retrieve the most relevant documents. On the other hand, through preparing one or more knowledge tags related with the query in the electronic document and creating indices for knowledge tags in multiple electronic documents, search engine may do nothing but search for created knowledge tags, thus reduce the workload of search engine and improve the precision and recall of the search engine's query. Moreover, the query speed of search engine is increased, thus improve the performance of search engine.

According to one aspect of the present invention, it is provided an electronic document processing method, comprising the steps of: generating one or more query according to the content of said document when an author is composing the electronic document; correspondingly storing information about said one or more query with said document.

According to another aspect of the present invention, it is provided an electronic document processing means, including: electronic document editing unit for editing an electronic document; feature extracting unit for extracting features from said electronic document being edited; query generating unit for generating query information about the content of the document according to the feature extracted by the feature extracting unit, wherein said query comprising keywords, keyword string or questions; and query storing unit for correspondingly storing the query information generated by the query generating unit with said electronic document.

According to another aspect of the present invention, it is provided an electronic document browsing method, comprises the steps of: reading query information correspondingly stored with the electronic document, wherein said query including keywords, keyword string or questions; presenting user with one or more query in query information; and representing the content of said electronic document to said user when user confirms said query.

According to another aspect of the present invention, it is provided an electronic document browser, comprising: electronic document browsing unit for browsing the content of the electronic document; query information reading unit for reading one or more query information correspondingly stored with the electronic document, wherein said query contains keywords, keyword string or questions; and query representing unit for representing the user with one or more query in query information read by the query information reading unit.

According to another aspect of the present invention, it is provided an electronic document retrieving method, comprising the steps of: extracting one or more query information correspondingly stored with the electronic document, wherein each of the query information containing keywords, keyword string or questions of one or more corresponding queries; indexing for the extracted multiple query information; in responsive to the user's queries, searching one or more queries, which is same or closely related to the user's query input, from the query indices; representing the user with said same or closely related queries; and providing the user with the electronic document or a link to said electronic document according to the user's selected query.

According to another aspect of the present invention, it is provided an electronic document retrieving system, comprising: query information extracting means for extracting query information correspondingly stored with said electronic document, wherein each of said query information containing keywords, keyword string or questions of one or more query; query indexing means for indexing the queries in said extracted query information; query index storing means for storing query indices produced by query indexing means; query searching means for searching one or more query, which are same with or closely related to the user's query input, from the query indices stored in query index storing means; query presenting means for presenting the user with one or more queries, which are same with or closely related to user's query, searched by query searching means; and electronic document providing means for providing the user with the electronic document or a link to said electronic document according to the user's selected query.

BRIEF DESCRIPTION OF THE SEVERAL VIEWS OF THE DRAWINGS

With the illustrations in attached figures and the detailed description of the specific embodiments, the present invention's features, advantages, objects and useful effects will be more apparent, wherein.

PREFERRED EMBODIMENTS FOR CARRYING OUT THE PRESENT INVENTION

With the attached figures, detailed description of each preferable embodiment according to the present invention will be discussed as following.

Electronic Document Processing Method

Figure 1:
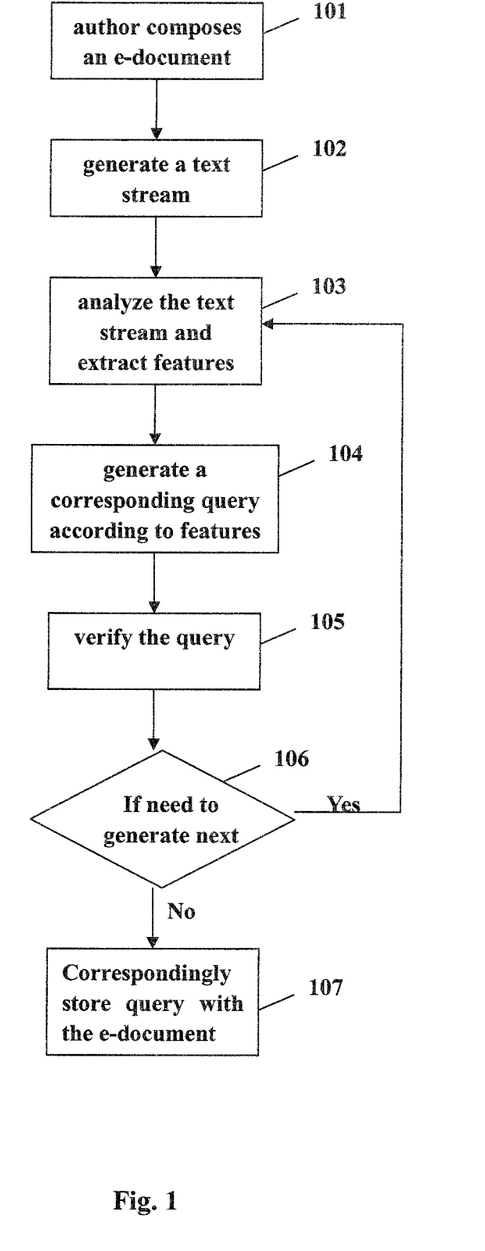
FIG. 1 is a flowchart showing an electronic document processing method according to an embodiment of the present invention.

According to one aspect of the present invention, an electronic document processing method is proposed herein. FIG. 1 is the flowchart of electronic document processing method according to one embodiment of the present invention.

As shown in FIG. 1, the author composes an electronic document in process 101. The electronic document processing method according to the present invention is based on the traditional authoring or editing methods. With these traditional authoring or editing tools, such as MS Word, Acrobat Writer or WPS, etc, the author can perform such operations as editing, viewing on the document. According to the present invention, a query (or queries) is/are generated when author has completed a whole document, or accomplished part of the document (such as a chapter).

Then, a text stream (or text segment) is selected to generate a query (queries) in process 102. In the electronic document processing method of the present invention, a part of the written document can be selected as a text stream by the author, and the text stream can also be generated automatically using algorithms based on the composed documents. Wherein, the author's document may be preprocessed firstly. And according to the processing methods based on currently available technologies, the preprocessing methods at least include followings: the operation of extracting text segments from the written document, and the operation of removing stopwords from the extracted text segments. Wherein stopwords are those frequently used and should be excluded from the searching range such as '的','地', '得','了', etc, in a foreign language glossary. If the text stream is generated automatically, history algorithm can be used to generate a text stream, which is relevant to the content of the author's document and need to be processed. Such a method is mainly based on such a property: the previous context that leads up to the current text may be relevant to current text segment and is helpful in generating the query for it. Here, history algorithm uses terms or words in the previous text segments to aid in generating a query (queries) for current text segment. In another word, with the relevance degree between the term vectors, the vector representation (for the old segment and it can be represented as vector $v_1$) of the text segment S previous to current text segment and the term vector of current text segment, the combination of corresponding text segments is determined and the text stream is generated then. That's to say, history algorithm combines the previous associated text segment with new text segments to generate the text stream that needs to be processed. Specifically, for text segments, the representation of vector stores the weight of each word, except stopwords, in the text segment. The method includes following processes:

i) Calculate the weight of each word, except the stopwords, in previous associated text segment, for example, utilizing the tf-idf algorithm, as shown in equation (1):

$$w_j = tf * idf \qquad (1)$$

In equation (1), tf represents the frequency of the term occurred in the text segment S. idf=all_segments/term_segments, here, all_segments is the number of independent text segments, which are the text segments used to generate a query (queries), in the whole document. And term_segments is the number of independent segments that contain the given term. It can be known that a query may correspond to several keywords, or keyword string, or some simple questions in currently available retrieving technologies.

ii) According to the weight of each term in text segment, calculate the similarity degree or relevance degree of the present text segment to multiple previous text segments S. Specifically, when receiving a new segment T, tf-idf algorithm is used to construct the vector of $v_2$ for representing new text segment. Then it checks the similarity of new text segment T with the old text segment S by computing a similarity score of their vectors, respectively, $v_2$ and $v_1$.

iii) Compare the similarity score of current text segment T and previous associated segment S with a given threshold. If the similarity score is higher than given threshold, it can be inferred that current text segment T is similar to the previous text. Otherwise, T is different from the previous text segment.

If text segment T is similar to the earlier text, the old term vector $v_1$ is decreased via multiplying every weight by attenuation factor $\alpha(0<\alpha<1)$ and then the two vectors are merged into vector $v_3$, and the vector $v_1$ is replaced with $v_3$. The candidate text stream ST can be obtained by combining S and T. Then T is replaced with ST and continues to receive new text segment. If T is dissimilar with previous text, segment T is current candidate text stream need to be processed. Moreover, $v_1$ is replaced with $v_2$, and T is replaced with S, thus good preparation is made for generating next text stream.

It should be known that the illustration above is just one of methods used to determine the text stream that needs to be processed, and other methods can also be utilized to get the text stream for generating queries.

Back to FIG. 1, in succession, in step 103, the generated text stream is analyzed, from which the terms or features relevant to search engine's query to be generated are extracted. It should be known that, as discussed above, through utilizing history algorithm the query on current text segment is generated with the assistance of using the words existing in previous associated text segment. For instance, features can correspond to a query with some keywords, keyword string or several simple questions.

Then, in step 104, a query, which is corresponding to the text stream in processing, is generated according to the extracted feature information. It can be known that there are many kinds of methods used to generate one or more query from the text stream. For example, author can input a query, which is regarded as the most relevant to the text stream by him/her. And the query can be generated automatically by utilizing algorithm. Here we can use tf-idf algorithm to generate queries. Under such circumstances, the weight of the keywords in combined vector can be used to choose keywords as a query.

Thereafter, in process 105, according to the document's content, the generated query was verified by performing some operations, such as viewing, modifying. Therefore, verification includes author's viewing and modifying the generated query, thus it is ensured that the query can represent the content of the document exactly and comprehensively.

In succession, in process 106, it's determined whether more query are expected to generate. Usually, a document may contain the content of many aspects and readers have different goals when searching and reading the document. Therefore, if in process 106 it is determined that the document also contains more query that can reflect the content of the document, the procedure will be back to the process 103 and a next query will be generated according to the generated feature information. If there is no other queries need to be generated, the procedure will go to process 107.

In the process 107, the information about query/queries is correspondingly stored with the document. For example, the keywords, the keyword string or some simple questions corresponding to the query may be stored. Specifically, according to the preferable embodiment of the present invention, the query information can be stored with electronic document as knowledge tags. For instance, the extensible language (XML) can be utilized to attach the tags to the document.

As mentioned above, the present invention doesn't limit the specific way by which the queries are stored. For example, it can be stored with the electronic document as a part of the electronic document, and it can also be stored separately as long as it can correspond to the electronic document.

From the descriptions above, it can be known that if the electronic document processing method according to the present embodiment is adopted, it can assist the author to complete several preparations for queries during the process of writing, and the veracity of the query (one or more keywords, keyword string or questions) is ensured by utilizing the author's understanding on the document without adding the burden of the author. And, since that multiple queries (one or more keywords, keyword string or questions), which can fully reflect the content of the document, can be generated for this document, it will be more exact and comprehensive when performing information retrieval using search engine, thus higher user's satisfaction can be obtained.

Electronic Document Processing Device

Figure 2:
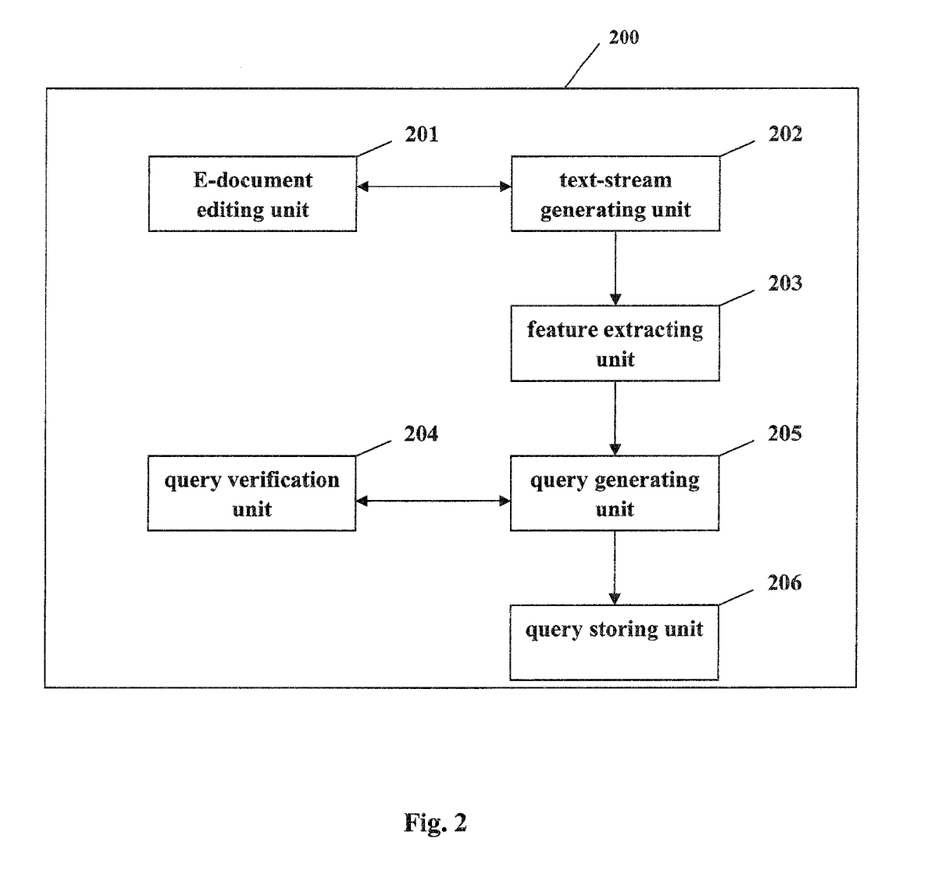
FIG. 2 is a schematic diagram showing the structure of an electronic document processing device according to an embodiment of the present invention.

With the same inventive concept of the invention, an electronic document processing means is provided according to another aspect of the present invention. FIG. 2 is a schematic diagram showing the structure of an electronic document processing device according to an embodiment of the present invention.

As shown in FIG. 2, the electronic document processing device 200 at least includes following units: an electronic document editing unit 201, which is used to edit an electronic document, wherein the electronic document editing unit 201 can be an independent editing unit, or currently available editors, such as MS word, Acrobat Writer or WPS, etc.; a text stream generating unit 202, which is used for author to process the written electronic document in order to determine the text stream that is used to generate query related to the document; a feature extracting unit 203, which is used to extract the features from the electronic document being edited, preferably, extract the features from the text stream generated by text-stream generating unit 202; a query generating unit 205, which is used to generate query information about the content of the document according to the feature information extracted by the feature extractor unit 203, wherein the query includes keywords, keyword string or questions; a query verification unit 204, which is used to validate and modify the queries generated by the query generating unit 205 according to the content of the document; and a query information storing unit 206, which is used to correspondingly store the queries generated by the query generating unit 205 with the electronic document.

Accordingly, the text stream generating unit 202 of the electronic document processing device 200 may further include following means: a weight calculating means, which is used to calculate the weightiness of each word in associated text segment of the document; a text segment similarity calculating means, which is used to calculate the similarity or relevance degree between current text segment and previous text segment in said electronic document according to the weight of each word in associated text segment of the document; a text stream determining means, which is used to compare the similarity score of the previous text segment and current segment with a given threshold and determine the text stream used to generate a query.

From the description of the embodiment above, it can be known that if the electronic document processing method according to the present embodiment is adopted, it can assist the author to complete several preparations for multiple queries during the process of writing, and the accuracy of the query (one or more keywords, keyword string or questions) is ensured by utilizing the author's comprehension on the document without adding the burden of the author. And, since that multiple queries (one or more keywords, keyword string or questions), which can fully reflect the content of the document, can be generated for this document, it will be more exact and comprehensive when performing information retrieving using search engine, thus higher user's satisfaction can be obtained.

Method for Browsing an Electronic Documents

With the same inventive concept of the invention, a method for browsing an electronic document is provided according to another aspect of the present invention. Wherein the electronic document is the one generated by the electronic document processing method mentioned above, i.e., the query information relevant to search engine is correspondingly stored with the electronic document.

Figure 3:
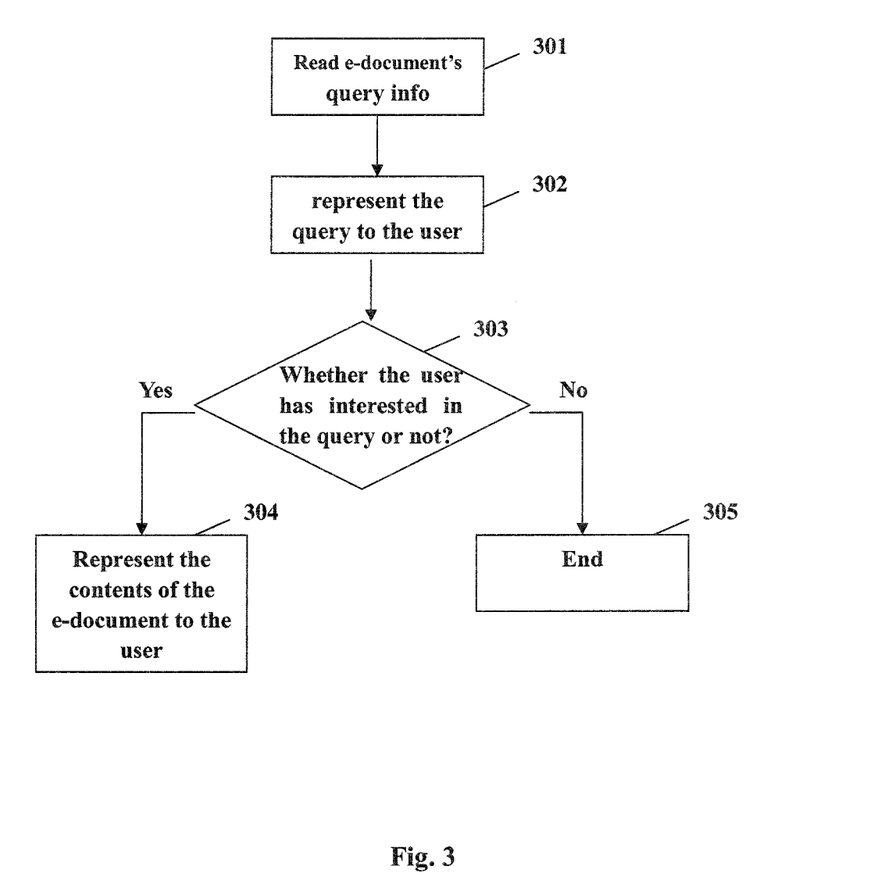
FIG. 3 is a flowchart showing an electronic document browsing method according to an embodiment of the present invention.

FIG. 3 is a flowchart showing an electronic document browsing method according to an embodiment of the present invention. As shown in FIG. 3, in process 301, query information stored in electronic document is retrieved firstly. Specifically, the query information is retrieved according to the way by which the information was stored. For example, if the query information is stored in the tail of the document as knowledge tags, the knowledge tags will be identified correspondingly and the query information will be read out from it.

In succession, in process 302, queries in the query information will be presented to the user. Specifically, there are various kinds of methods for query's representation. For example, a list can be listed containing the keywords, keyword string or several simple questions. Or, if the amount of the queries are too large, user can input the content of the query that user expects to perform. Then select the query whose keywords, keyword string or questions are closely related to those of the query or queries input by the user and represent the most related one to the user.

In succession, in process 303, the reader verifies the query and judges that if he/she is interested in the document. If the user has interests in the document and makes a confirmation, then the procedure will enter into process 304, and the corresponding content of document will be represented to the reader. Otherwise, the document's content won't be represented and the procedure enters into the process 305 to end the process by closing the document.

From the description of the embodiment above, it can be known that if the method for browsing the electronic documents according to the present embodiment is adopted, the electronic document's query information, which is generated by the method for electronic document processing according to the present invention mentioned above, can be utilized. Before all content of document are presented to the reader, the query about the content of the document, which is verified by the user, will be provided to the reader for viewing. Reader can understand approximate content of the document, thus the reading time can be saved for the reader.

Electronic Document Browser

With the same inventive concept of the invention, an electronic document browser is provided according to another aspect of the present invention. Wherein the electronic document is the one generated by the electronic document processing method mentioned above, i.e., the query information relevant to search engine is stored with respect to the electronic document.

Figure 4:
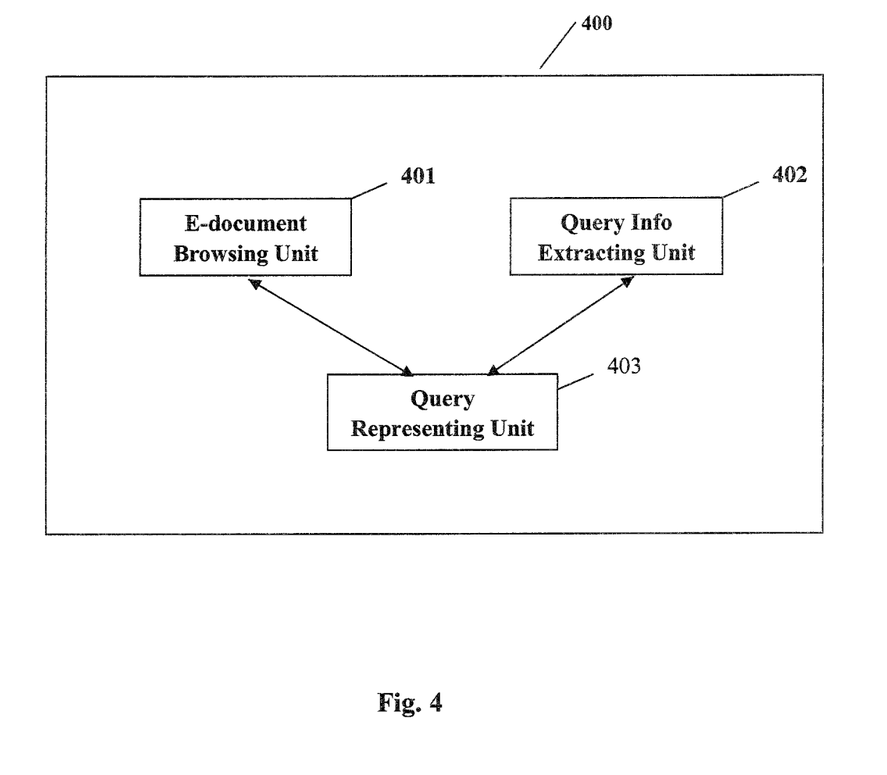
FIG. 4 is a block schematic diagram showing the structure of an electronic document browser according to an embodiment of the present invention.

FIG. 4 is a block schematic diagram showing the structure of an electronic document browser according to an embodiment of the present invention. As shown in FIG. 4, the electronic document browser 400 at least includes following units:

an electronic document browsing unit 401, which is used to browse the electronic document's content. It can be a browser using current technologies such as MS Word Viewer, MS Internet Explorer, Netscape Navigator, Acrobat Reader, etc;

a query information reading unit 402, which is used to read the query information correspondingly stored with the electronic document. Specifically, the query information is read out according to the way it was stored. For instance, if the query information is stored in the tail of the document as knowledge tags, the knowledge tag will be identified correspondingly and the query information will be read out.

a query information representing unit 403 for representing to the user the query which is in the query information read out by the query information reading unit. Specifically, there are various kinds of ways to represent the query. For example, the keywords, keyword string or several questions can be listed as a list. Or, if the amount of the queries are large, user can input the query that user expected to perform. Then the query, which is the same with or closely related to the query input by the user, will be selected from the query list and the query will be represent to the user. Under such circumstances, the browser 400 of the present invention can further contain a query selection unit (not shown). The query selection unit is used to select the query that is the same or closely related to the user's query from the queries in the list of query information.

From the description of the embodiment above, it can be known that the electronic document browser in this embodiment can implement the electronic document browsing method mentioned above of the present invention. If the electronic document browser according to the present embodiment is adopted, the electronic document's query information, which is generated by the electronic document processing method of the present invention mentioned above, can be utilized. Before all contents are presented to the reader, the query about the content of the document, which is verified by the user, will be provided to the reader for viewing. Reader can understand approximate content of the document, thus the reading time can be saved for the reader.

Electronic Document Retrieving Method

With the same inventive concept of the invention, a method for retrieving electronic document is provided according to another aspect of the present invention. Wherein the electronic document is the one generated by the electronic document processing method mentioned above, i.e., the query information relevant to search engine is correspondingly stored with the electronic document.

Figure 5:
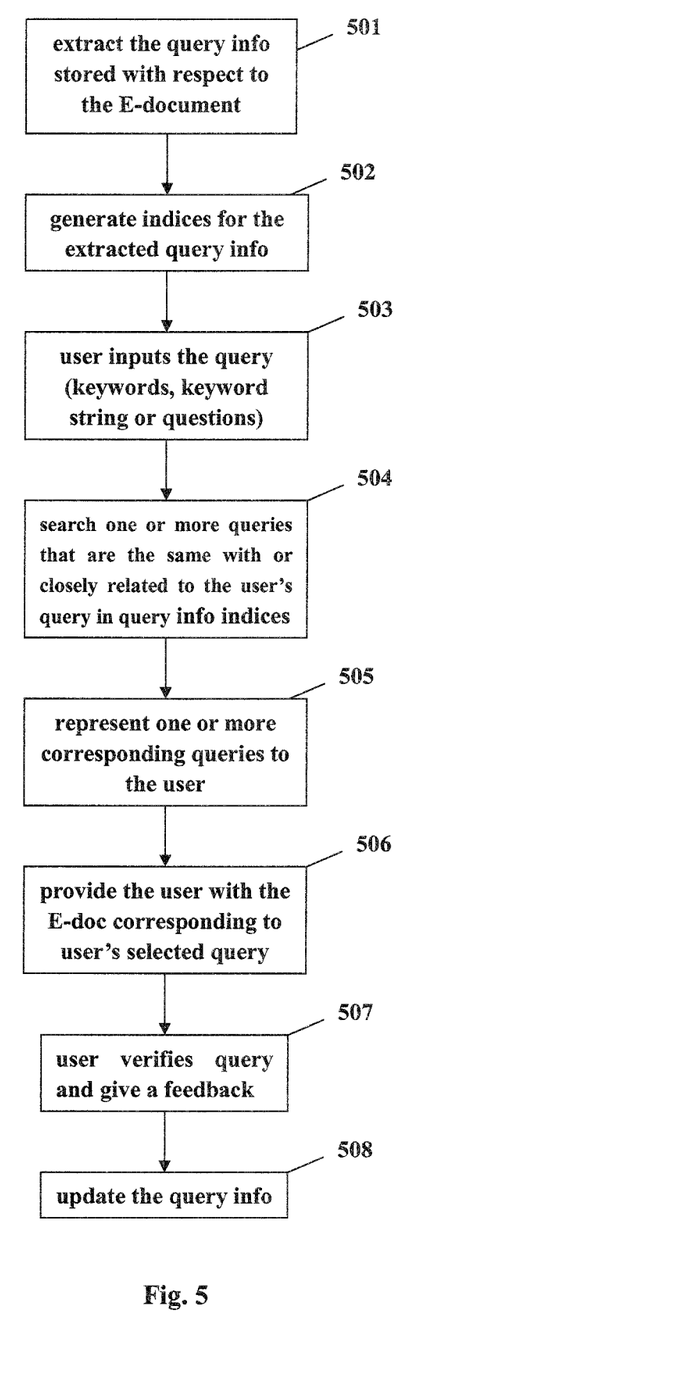
FIG. 5 is a flowchart showing an electronic document retrieving method according to an embodiment of the present invention.

FIG. 5 is a flowchart showing an electronic document retrieving method according to an embodiment of the present invention. As shown in FIG. 5, in process 501, firstly, the query information correspondingly stored with multiple electronic documents, are extracted, and each of them contains one or more keywords, keyword string or questions in corresponding query. Specifically, if the author of the electronic document uses the electronic document processing means mentioned above to compose the document, every document may contain the query information (one or more keywords, keyword string or questions) about the query on the content of the document. In process 501, the query information about multiple electronic documents will be extracted. Especially, for the electronic documents published on the Internet, web crawler can be utilized to search every electronic document all over the network and the corresponding query information will be extracted, for instance, it is extracted from the knowledge tags.

In succession, in process 502, the indices are generated for the extracted query information. Here, various kinds of retrieving methods in information retrieving field can be used to generate the indices for these queries, such as inverted files, signature files, PAT trees, or PAT arrays, etc.

In succession, in process 503, the user input his/her own query. User's query can be one or more keywords, keyword string or questions.

In succession, in process 504, one or more queries, which are the same with or closely related to the query inputted by the user, will be found out in the query indices. Specifically, the method calculates the relevance degree between the user's query and each query in the query indices, and the query whose relevance degree is the largest or larger than a given value will be selected.

Then, in process 505, the query that is the same with or closely related to the user's query will be represented to the user. And, in process 506, when user selects one of the queries, the user will be provided with the electronic document corresponding to user selected query or with a link to said electronic document.

Moreover, the method may contain process 507 either. In this process, user can give a feedback to indicate whether the query is accurate. So, in process 508, the query information can be updated according to the feedback.

From the description of the embodiment above, it can be known that the electronic document retrieving method of the present embodiment can utilize the electronic document's query information that is generated by the electronic document processing method mentioned above according to the present invention. And the query information are extracted and used to improve the performance of information acquisition. Since that the queries in query information have passed the verification, the accuracy and readability of the query can be guaranteed. As a result, the electronic document retrieving method of the present embodiment is more accurate. Further more, before all contents are presented to the reader, the query about the content of the document, which is verified by the user, will be provided to the reader for viewing. Reader can understand approximate content of the document, thus the reading time can be saved for the reader. In addition, because that reader (user utilizing search engine for querying) can give a feedback to notify whether the query provided in the electronic document is accurate or not, the corresponding query can be updated based on such a feedback. Therefore, the accuracy of search engine can be improved exactly.

Electronic Document Retrieving System

With the same inventive concept of the invention, an electronic document retrieving system is provided according to another aspect of the present invention. Wherein the electronic document is the one generated by the electronic document processing method mentioned above, i.e., the query information related to search engine is stored with respect to the document.

Figure 6:
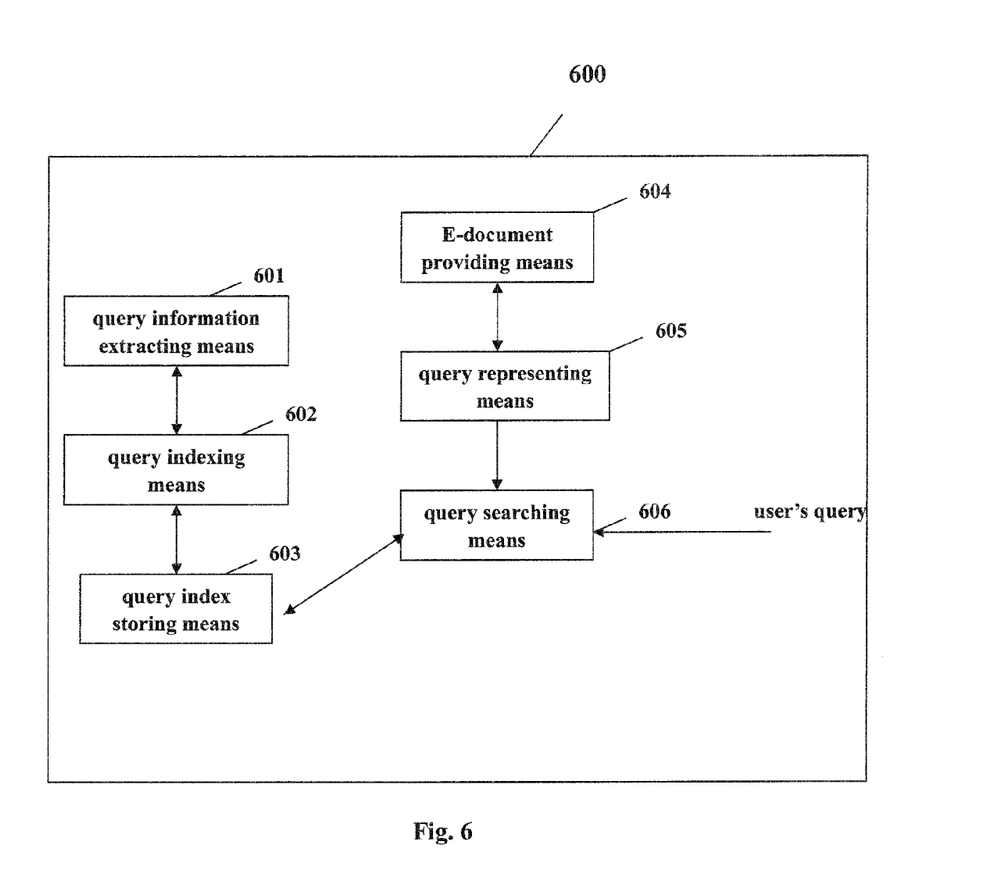
FIG. 6 is a block schematic diagram showing the structure of an electronic document retrieving system according to an embodiment of the present invention.

Corresponding to the electronic document retrieving method illustrated in FIG. 5, FIG. 6 is a block schematic diagram showing the structure of an electronic document retrieving system according to an embodiment of the present invention.

As shown in FIG. 6, the electronic document retrieving system 600 contains at least following components. A query information extractor 601, which is used to extract the query information correspondingly stored with the electronic document. Each of the query information contains keywords, keyword string or questions of one or more corresponding queries. As discussed above, the query information extractor 601 may be a web crawler used to search every electronic document all over the network and extract the corresponding query information. A query index means 602 for generating indices for the queries in extracted query information. A query index storing means 603 for storing the query indices produced by query index means 602. A query searching means 606 for searching one or more query, which are the same with or closely related to the user's query input, from the query indices stored in the query index storing means 603. A query presentation means 605 for presenting the user with one or more queries, which are the same with or closely related to user's query and found by the query searching means 606. An electronic document supply means 604 for providing the user with the electronic document corresponding to the user's selected query or with a link to said electronic document.

Furthermore, the retrieving system 600 may also include following components. A similarity calculating means (not shown) for calculating the similarity between two queries (keywords, keyword string or questions). Consequently, the query searching means 606 will utilize such means to calculate the relevance degree between user's query input and the queries in query indices and get out one query with the largest relevance degree or the one whose relevance degree is larger than a given value.

Moreover, the retrieving system 600 may also include: a query feedback means (not shown), which allows the user to verify the represented query through such operations as evaluating, modifying, etc; and a feedback will be returned correspondingly. Therefore the corresponding query information will be updated.

From the description of the embodiment above, it can be known that the electronic document retrieving system of the present embodiment can carry out the electronic document retrieving method illustrated in FIG. 5. And the query information, which is generated by the electronic document processing method mentioned above according to the present invention, can be used to improve the performance of information acquisition. Since that the queries in query information have passed the verification, the accuracy and readability of the query can be guaranteed. As a result, the method for retrieving electronic document of the present embodiment is more accurate. Further more, before all contents are presented to the reader, the query about the content of the document, which is verified by the user, will be provided to the reader for viewing. Reader can understand approximate content of the document, thus the reading time can be saved for the reader. In addition, because that user can give a feedback to notify whether the query provided in the electronic document is accurate or not, the corresponding query can be updated. Therefore, the accuracy of search engine can be improved exactly.

The method for processing an electronic document and its corresponding device, the method for browsing an electronic document and its corresponding browser, and the method for retrieving an electronic document and its corresponding retrieving system are disclosed above through examples, but it should be noted that these embodiments are only exemplary examples, persons skilled in this technical field can make various alterations or modifications in implementing of the present invention without departing from the spirit or scope thereof. Therefore, the invention is not limited to these embodiments, and is only defined by the following claims.

What is claimed is:

1. An electronic document browsing method, the method comprising steps of:

creating, while the author is composing the electronic document, one or more queries according to content of the electronic document, and storing, in a computer, the created one or more queries with the electronic document, the created one or more queries including one or more of: keywords, keyword strings and questions, related to the content to the electronic document, the creating the queries including:

calculating relevance degree of a term vector of a previous text segment and a term vector of a current text segment, the term vector of the previous text segment including a weight of each word included in the previous text segment, the term vector of the current text segment including a weight of each word included in the current text segment;

if the relevance degree is higher than a threshold,
  decreasing the term vector of the previous text segment by values of multiplications of every weight of the each word of the previous text segment and an attenuation factor;
  merging the term vector of the previous text segment and the term vector of the current text segment;
  replacing the term vector of the previous text segment with the merged term vector;
  merging the previous text segment with the current text segment; and
  replacing the current text segment with the merged text segment;
if the relevance degree is less than or equal to the threshold,
  replacing the term vector of the previous text segment with the term vector of the current text segment; and
  replacing the current text segment with the previous text segment;
receiving, at the computer, a second query from a user;
searching, by the computer, the created one or more queries which are same or related to the second query;
presenting, by the computer, the user with the one or more searched queries which are same or related to the second query;
reading, by the user, the one or more presented queries;
selecting, by the user, one of the one or more presented queries; and
presenting, by the computer, the user with the content of said electronic document corresponding to the selected query.

2. A computer-implemented system for improving searchability of an electronic document, the system comprising:
a computer,
wherein the computer is configured to:
  analyze contents of electronic documents, while authors are composing electronic documents;
  create one or more queries corresponding to contents of electronic documents, while authors are composing the electronic documents, in order to create the queries, the computer is further configured to:
    calculate relevance degree of a term vector of a previous text segment and a term vector of a current text segment, the term vector of the previous text segment including a weight of each word included in the previous text segment, the term vector of the current text segment including a weight of each word included in the current text segment;
    if the relevance degree is higher than a threshold,
      decrease the term vector of the previous text segment by values of multiplications of every weight of the each word of the previous text segment and an attenuation factor;
      merge the term vector of the previous text segment and the term vector of the current text segment;
      replace the term vector of the previous text segment with the merged term vector;
      merge the previous text segment with the current text segment; and
      replace the current text segment with the merged text segment;
    if the relevance degree is less than or equal to the threshold,
      replace the term vector of the previous text segment with the term vector of the current text segment; and
      replace the current text segment with the previous text segment;
  store the one or more created queries with the electronic documents;
  receive a second query from a user;
  search the created one or more queries, which are same or related to the second query;
  present the user with one or more searched queries which are same or related to the second query;
  enable the user to select one or more of the presented queries; and
  present content of an electronic document corresponding the selected one or more queries.

3. The computer-implemented system according to claim 2, wherein the computer is further configured to:
  present the user with the one or more selected queries.

4. An electronic document retrieving method, the method comprising steps of:
  extracting, by a computer, one or more queries stored with electronic documents, wherein each of the one or more extracted queries including one or more of: keywords, keyword string and questions, related to contents of the electronic documents, the extracting the queries including:
    calculating relevance degree of a term vector of a previous text segment and a term vector of a current text segment, the term vector of the previous text segment including a weight of each word included in the previous text segment, the term vector of the current text segment including a weight of each word included in the current text segment;
    if the relevance degree is higher than a threshold,
      decreasing the term vector of the previous text segment by values of multiplications of every weight of the each word of the previous text segment and an attenuation factor;
      merging the term vector of the previous text segment and the term vector of the current text segment;
      replacing the term vector of the previous text segment with the merged term vector;
      merging the previous text segment with the current text segment; and
      replacing the current text segment with the merged text segment;
    if the relevance degree is less than or equal to the threshold,
      replacing the term vector of the previous text segment with the term vector of the current text segment; and
      replacing the current text segment with the previous text segment;
  generating indices for the extracted one or more queries;
  receiving, at the computer, a second query from a user;
  in response to receiving the second query, searching, by the computer, the one or more extracted queries, which are same or related to the second query;
  presenting the user with said same or related queries;
  enabling the user to select one or more of said same or related queries; and
  providing the user with an electronic document corresponding to the selected one or more queries.

5. The electronic document retrieving method according to claim 4, wherein the step of searching further comprises:
  calculating relevance degree between the second query and each of the one or more extracted queries;

selecting one of the extracted one or more queries, the selected query having a largest relevance degree or having a relevance degree larger than a given value.

6. A computer-implemented electronic document retrieving system, the system comprising:
 a computer,
 wherein the computer is configured to:
 extract one or more queries stored with electronic documents, wherein each of said one or more extracted queries including one or more of: keywords, keyword string and questions, related to contents of the electronic documents, in order to extract the queries, the computer is further configured to:
  calculate relevance degree of a term vector of a previous text segment and a term vector of a current text segment, the term vector of the previous text segment including a weight of each word included in the previous text segment, the term vector of the current text segment including a weight of each word included in the current text segment;
  if the relevance degree is higher than a threshold,
   decrease the term vector of the previous text segment by values of multiplications of every weight of the each word of the previous text segment and an attenuation factor;
   merge the term vector of the previous text segment and the term vector of the current text segment;
   replace the term vector of the previous text segment with the merged term vector;
   merge the previous text segment with the current text segment; and
   replace the current text segment with the merged text segment;
  if the relevance degree is less than or equal to the threshold,
   replace the term vector of the previous text segment with the term vector of the current text segment; and
   replace the current text segment with the previous text segment;
 generate indices for the one or more extracted queries, and store the generated indices;
 receive a second query from a user;
 search the one or more extracted queries, which are same with or related to the second query;
 present the user with the same or related queries;
 enable the user to select one or more of the same or related queries; and
 provide the user with an electronic document corresponding to the selected one or more queries.

7. The computer-implemented electronic document retrieving system according to claim 6, wherein the computer is further configured to:
 calculate the relevance degree between the second query and each of the one or more extracted queries; and
 select a query among the one or more extracted queries, the selected query having a largest relevance degree or having a relevance degree larger than a given value.

8. An article of manufacture comprising a computer usable medium, the computer usable medium excluding a propagating signal, the computer usable medium having computer readable program code means embodied therein for causing electronic document browsing, the computer readable program code means in said article of manufacture comprising computer readable program code means for causing a computer to effect the steps of claim 1.

9. An article of manufacture comprising a computer usable medium, the computer usable medium excluding a propagating signal, the computer usable medium having computer readable program code means embodied therein for causing electronic document retrieving, the computer readable program code means in said article of manufacture comprising computer readable program code means for causing a computer to effect the steps of claim 4.

10. A computer program product comprising a computer usable medium, the computer usable medium excluding a propagating signal, the computer usable medium having computer readable program code means embodied therein for causing functions of an electronic document retrieving system, the computer readable program code means in said computer program product comprising computer readable program code means for causing a computer to effect the functions of claim 6.

11. A computer program product comprising a computer usable medium, the computer usable medium excluding a propagating signal, the computer usable medium having computer readable program code means embodied therein for causing functions of a computer-implemented system for improving searchability of an electronic document, the computer readable program code means in said computer program product comprising computer readable program code means for causing a computer to effect the functions of claim 2.

12. The electronic document browsing method according to claim 1, the method further comprising:
 generating a text stream of the electronic document being composed
 extracting one or more features from the generated text stream,
 wherein the one or more queries are automatically created according to the content of the electronic document being composed and according to the extracted features.

13. The electronic document browsing method according to claim 12, wherein the generating the text stream comprises:
 identifying every text segment in the electronic document being composed;
 calculating a weight of each of the every text segment;
 calculating, based on the weight of the each text segment, a similarity degree of a current text segment to a plurality of previous text segments;
 comparing the calculated similarity degree against a threshold;
 determining that the current text segment is similar to a corresponding previous text segment if the similarity degree is larger than the threshold; and
 replacing the current text stream with a combination of the current text stream and the corresponding previous text segment.

14. The electronic document browsing method according to claim 13, the method further comprising:
 receiving a new text segment entered into the electronic document being composed;
 repeating the calculating the weight, the calculating the similarity degree, the comparing, the determining, the replacing upon the receipt of the new text segment.

* * * * *